(12) United States Patent
Fiocco

(10) Patent No.: US 6,910,248 B2
(45) Date of Patent: Jun. 28, 2005

(54) COUPLING SYSTEM FOR REMOVABLE OR DETACHABLE HANDLES OF VARIOUS UTENSILS, IN PARTICULAR POTS, PANS AND THE LIKE

(76) Inventor: Maria Grazia Fiocco, Via Trento, 554-I-37020, Dolce' (Verona) (IT)

( * ) Notice: Subject to any disclaimer, the term of this patent is extended or adjusted under 35 U.S.C. 154(b) by 6 days.

(21) Appl. No.: 10/399,081

(22) PCT Filed: Apr. 13, 2001

(86) PCT No.: PCT/IT01/00187

§ 371 (c)(1),
(2), (4) Date: Apr. 11, 2003

(87) PCT Pub. No.: WO02/30254

PCT Pub. Date: Apr. 18, 2002

(65) Prior Publication Data

US 2004/0055115 A1 Mar. 25, 2004

(30) Foreign Application Priority Data

Oct. 13, 2000 (IT) .................................... VR2000A0103

(51) Int. Cl.[7] ............................................. B25B 13/00
(52) U.S. Cl. ...................................................... 16/406
(58) Field of Search ........................ 16/406, 422, 425, 16/DIG. 41, DIG. 25, DIG. 24; 220/759; 81/177.2, 177.1

(56) References Cited

U.S. PATENT DOCUMENTS

| | | | | |
|---|---|---|---|---|
| 2,712,151 A | * | 7/1955 | Becht | 220/759 |
| 3,157,909 A | * | 11/1964 | Schmitt | 220/759 |
| 3,269,765 A | * | 8/1966 | Pryce | 294/31.1 |
| 3,272,547 A | * | 9/1966 | Pryce | 294/31.1 |
| 3,306,647 A | * | 2/1967 | Imhoff | 294/27.1 |
| 3,422,485 A | * | 1/1969 | Pryce | 16/422 |
| 3,431,006 A | | 3/1969 | Makita | |
| 4,577,367 A | * | 3/1986 | Durand | 220/759 |
| 4,809,995 A | * | 3/1989 | Ramunas | 279/77 |
| 5,887,751 A | * | 3/1999 | Kroscher | 220/759 |
| 6,257,439 B1 | * | 7/2001 | Hsu | 220/759 |
| 6,260,733 B1 | * | 7/2001 | Eimerman | 220/759 |
| 6,341,714 B1 | * | 1/2002 | Bogani | 220/759 |
| 6,439,420 B1 | * | 8/2002 | Park | 220/759 |

FOREIGN PATENT DOCUMENTS

| | | |
|---|---|---|
| FR | 1 501 026 A | 1/1968 |
| WO | WO 00 21422 A | 4/2000 |

OTHER PUBLICATIONS

International Search Report dated Sep. 20, 2001.

* cited by examiner

*Primary Examiner*—Suzanne Dino Barrett
*Assistant Examiner*—Mark Williams
(74) *Attorney, Agent, or Firm*—Charles Berman, Esq.; Greenberg Traurig, LLP

(57) ABSTRACT

A coupling system for removable handles of pots, pans and the like comprises the following basic elements: a support bracket (2) designed to support or receive the handle in various ways, which can also be a handgrip or any other gripping element designed for the same purpose; a housing (4) cut into said bracket (2) designed to accomodate a pin (5) whose rotation shaft (6) is excentric and supports an arm (7) which turns in an angular fashion, or a central lever or other element designed for the same purpose; a fixed stricker element (8) integral with said bracket and designed to form a coupling housing in which the edge of the pan (11), for example a gudgeon, are inserted; if necessary, a block (9) operated by the eccentric pin and the arm, allowing rotation of the pin, said block being designed to allow gripping of the edge of the pan (or the elements which protrude from it, e.g. a gudgeon) without any friction.

17 Claims, 7 Drawing Sheets

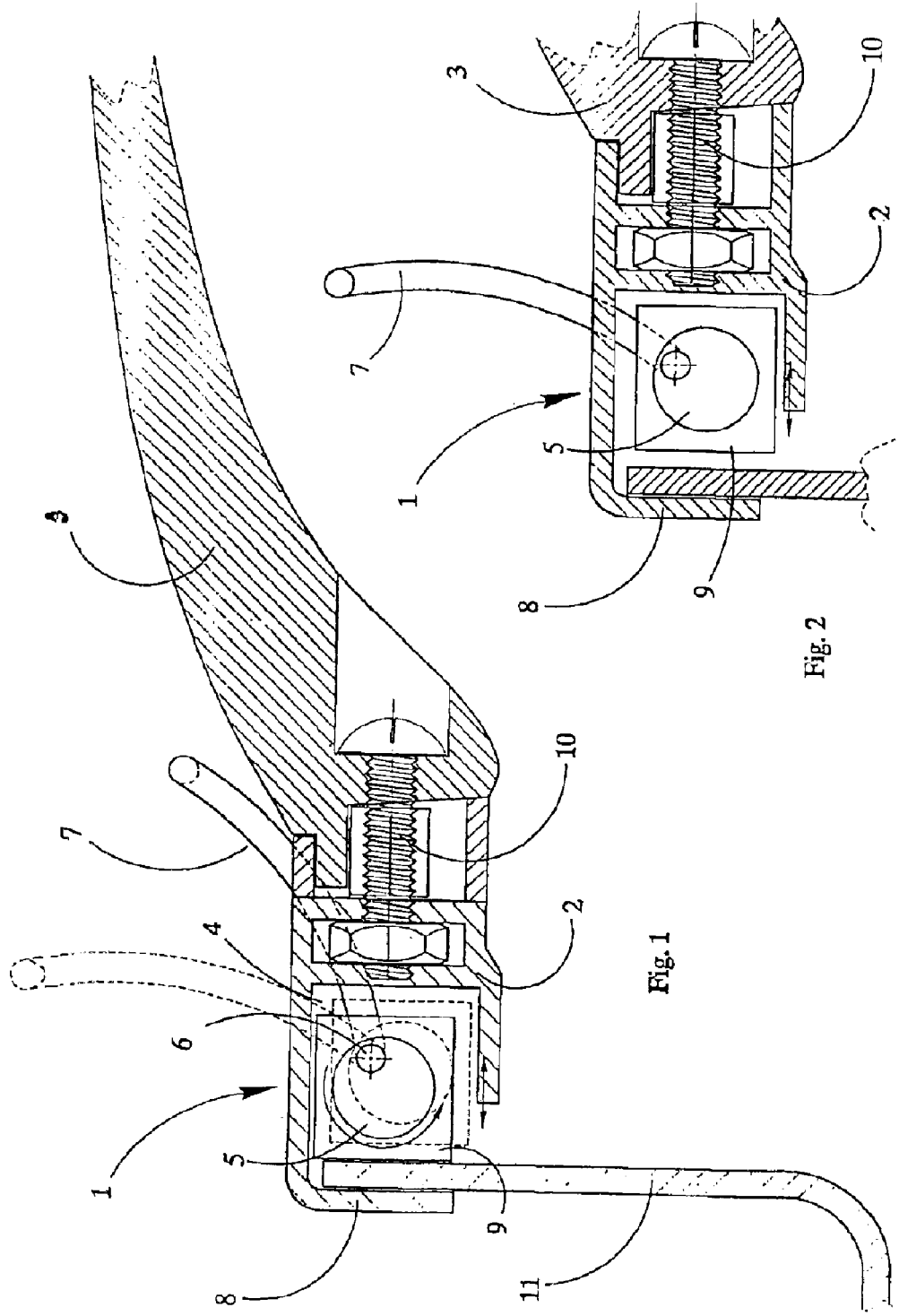

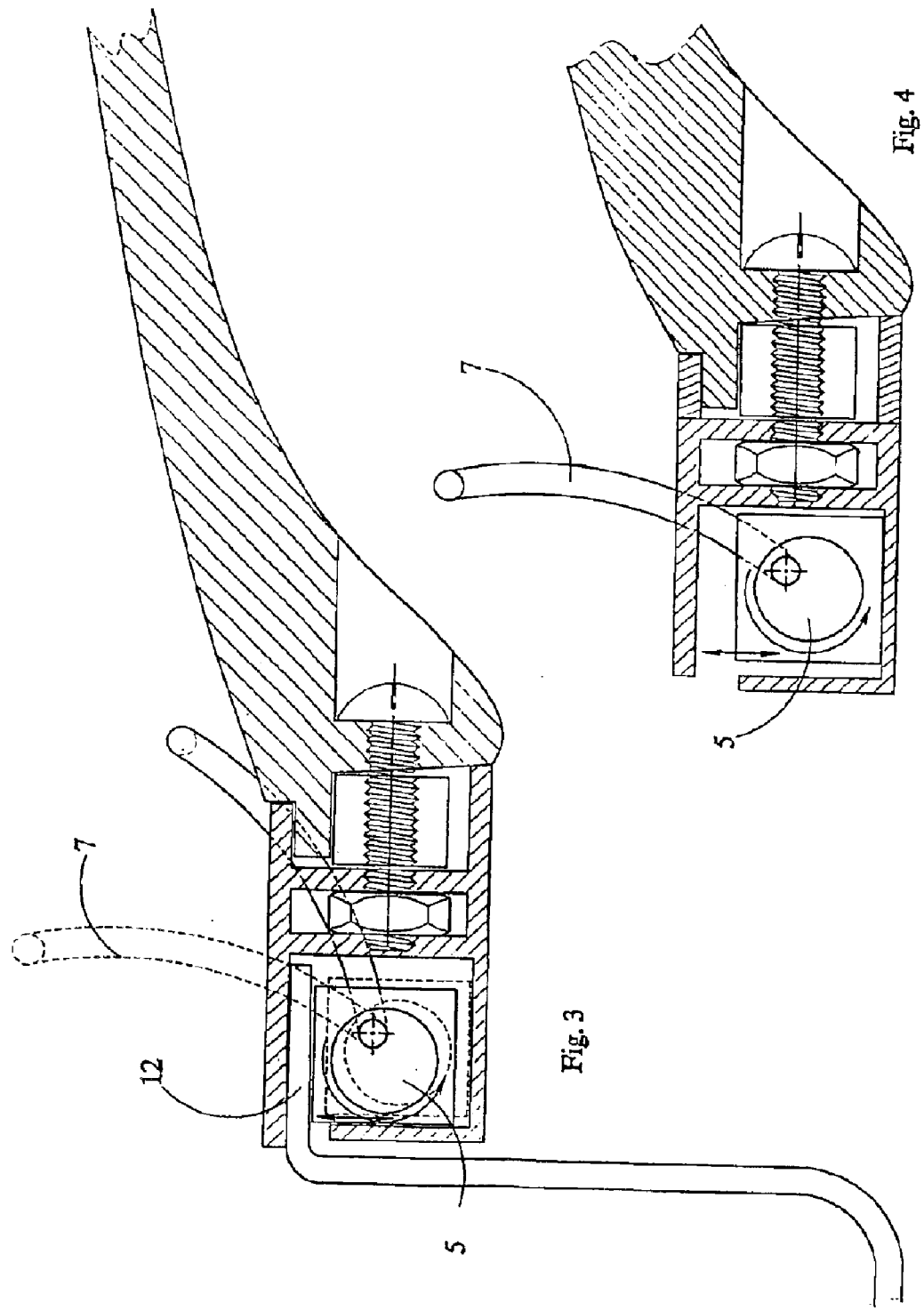

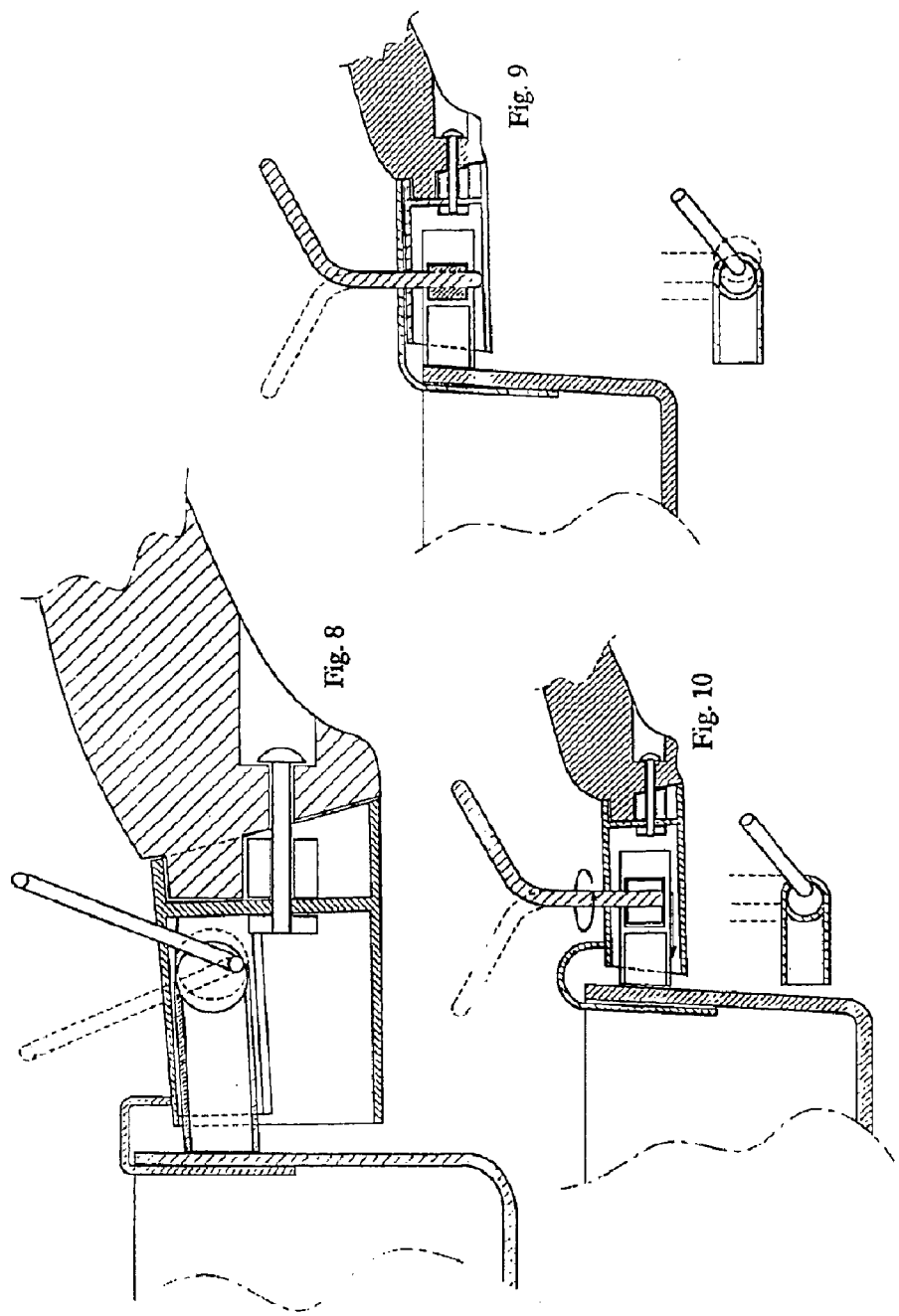

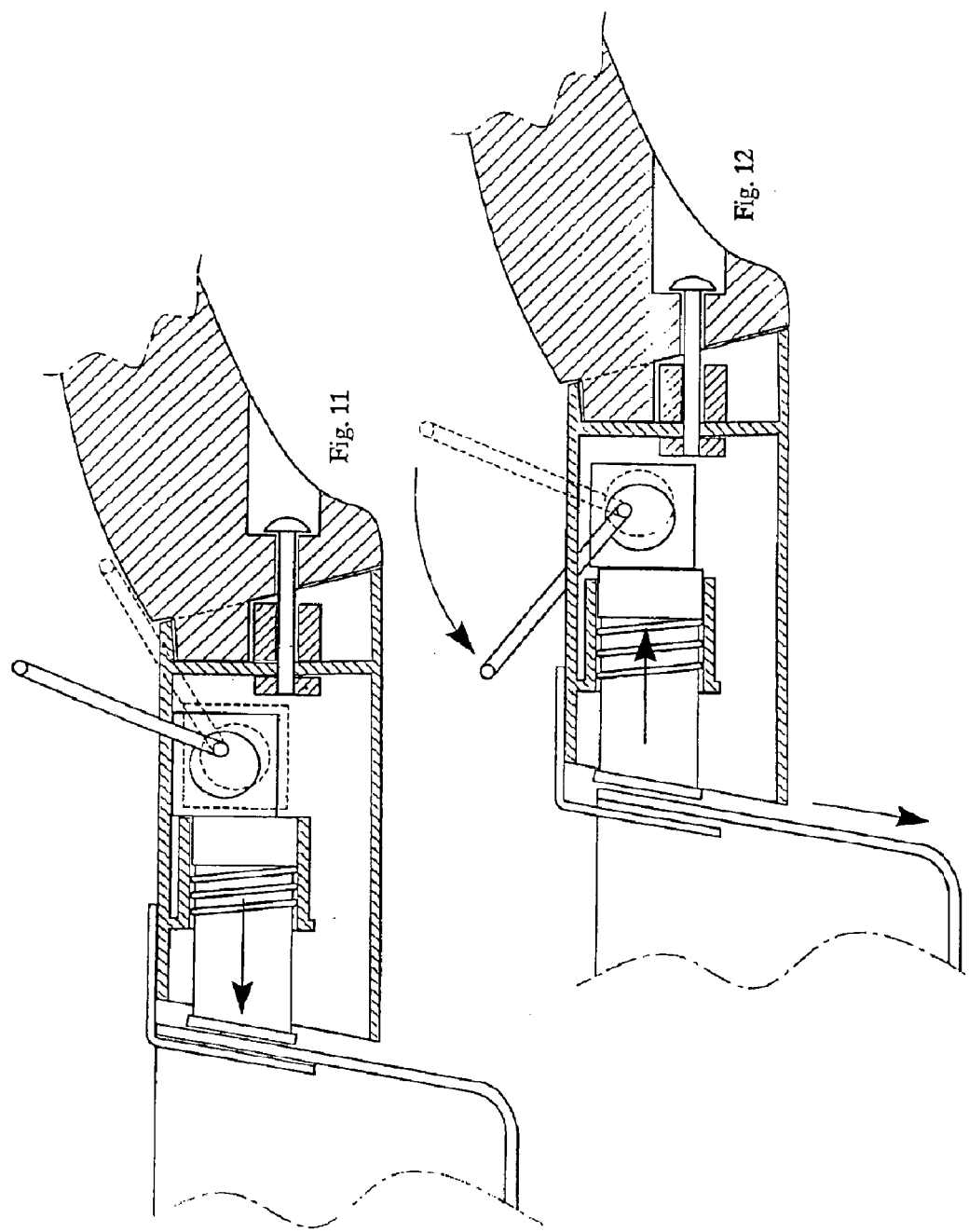

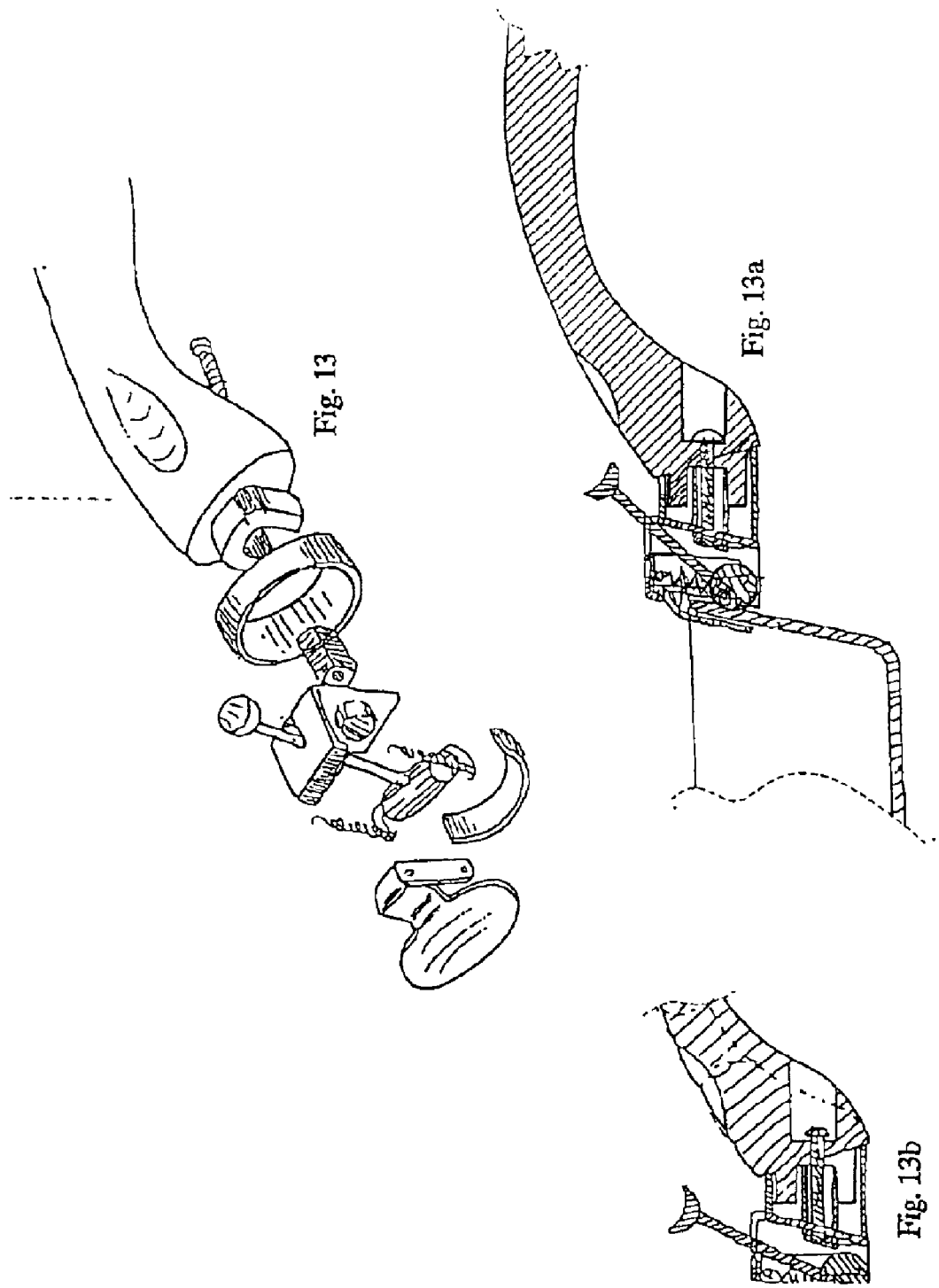

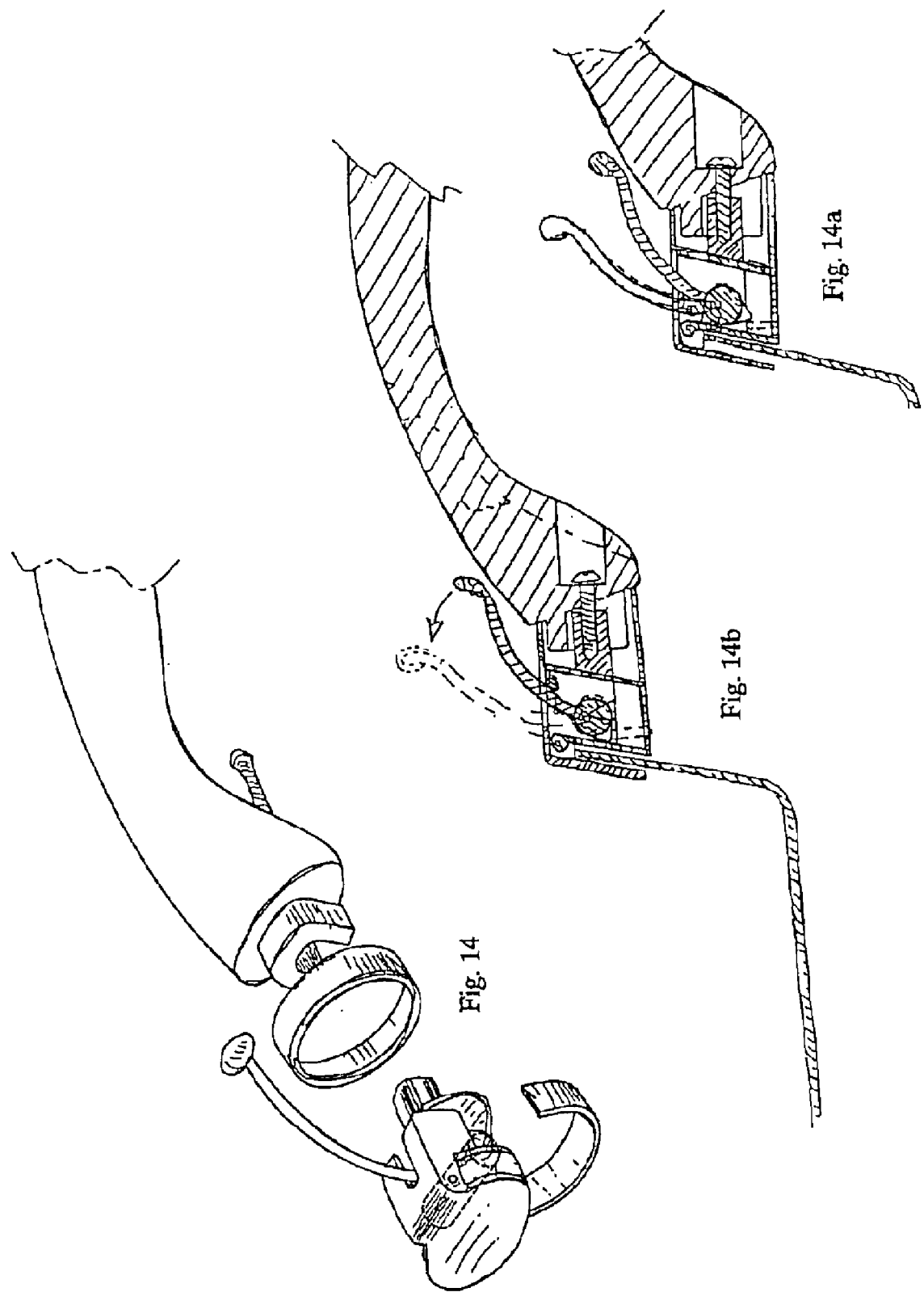

COUPLING SYSTEM FOR REMOVABLE OR DETACHABLE HANDLES OF VARIOUS UTENSILS, IN PARTICULAR POTS, PANS AND THE LIKE

TECHNICAL FIELD

The present application proposes a coupling system for removable or detachable handles of various utensils, in particular pots, pans and containers in general for heating or cooking food.

This is a new concept which makes it possible to attach removable type handles to pots, pans and the like, to satisfy practical requirements in the use of these containers, in other words first of all the interchangeability of the pieces with at least two advantageous consequences: the possibility of using the same handles for various pans and the possibility of storing the containers without their handles, in order to save space which is well-known to be at a premium in kitchens, for example if necessary to store the container in a refrigerator, or for cooking in the oven or during dishwashing.

BACKGROUND ART

With respect to the know solutions, this system offers the substantial advantage of simplicity in the manufacture and use of the removable handles, with consequent simplification of the production processes.

In the household articles sector, particularly as far as containers for cooking are concerned, the need exists to produce pots, pans or containers in general with certain contrivances that make them highly functional, at least from the point of view of safety during cooking and, no less important, of practicality in us.

The need has recently arisen in this sector to produce removable or detachable handles, and a number of products have been presented on the market which foresee the possibility of using interchangeable handles, although, to date, the solutions developed are in some cases impractical and in others so complicated and costly as to make them unacceptable or in any case inadequate.

In some cases, in fact, the interchangeable handles merely foresee the use of blocking systems by means of screws, while in other cases some firms have developed more advanced systems which foresee the possibility of attaching the handle to the edge of the pan by the use of gripper type systems, or by constructing a sliding coupling that moves away from or towards the body of the handle by means of levers which may be spring-operated.

These are, nevertheless, solutions which in the first case are difficult to use, requiring the use of screws or bolts, while in the second case complex and costly mechanical parts have to be produced that must be adapted to the shape of the handle, with production costs that are often excessive.

FR-A-1501026 for example, describes a detachable handle for cooking utensils comprising a handgrip in which is housed a flowing rod ending with a broadened part jutting out the handgrip and suited to joint a thin plate of the utensil to handle. Said handle comprises also a movable lever which is connected to the flowing rod to control the position of the broadened part in relation to the head of the handgrip and allowing in this way to fasten and release the thin plate of the utensil.

Furthermore WO-A-00/21422 describes a removable coupling between a handle and a pan comprising a first member fixed to the pan and a second member fixed to the handle. The first member comprises a project bracket with a hole therein and the second member comprises a tongue to be inserted in the said hole to lie parallel with and beneath the bracket. A cam member is present in the second member and is rotatable towards a locking position to press with its first cam surface on the edge of said hole to scarf the bracket between the first cam surface and a facing projection of the second member.

The document U.S. Pat. No. 3,431,006 describes a detachable handle apparatus for connection with an object having an integral extension extending therefrom, said handle apparatus including a handle portion which is secured with respect to the extension by means of a clamping member pivotally connected with respect to the handle portion and adapted to be cammed into a locking engagement with the extension by means of a locking lever connected with respect to said handle portion for pivotal movement in a horizontal plane.

DESCRIPTION OF THE INVENTION

The aim of this invention is to provide a coupling system for removable or detachable handles for various utensils, in particular for pots, pans and containers in general, that can overcome the above-mentioned drawbacks, through the implementation of a new mechanical principle in this sector, i.e. an eccentric system.

The immediate advantage of this new concept lies in the construction simplicity of the pieces and of their offer for sale at limited costs.

Another advantage of this invention is that it lends itself to numerous variations and solutions that can be adapted to different types of pots and pans, of all the models and shapes on the market, in other words the traditional types commonly used in this sector.

The aims and advantages indicated above are all achieved, according to this invention, by means of a coupling system for removable or detachable handles for various utensils, in particular pots, pans and containers in general, for example of the type for heating or cooking food, characterised in that for the application and fixing of said handles on the pan a blocking system with eccentric pins, cams or the like is used, operated by means of angular movement arms, and in that said cam or eccentric pin systems acts directly on the edge of the pan or on its coupling means with respect to a fixed striker means, or by operating a block or blocking element for gripping the edge of the pan, countering a fixed striker element.

ILLUSTRATION OF DRAWINGS

Additional features and details of the invention will be better understood from the description which follows, given as a non-binding example, referring to the attached drawings in which:

FIG. 1 represents a cross section of the coupling system according to the invention in a preferred construction example in closing position, or of the coupling type for a vertical wall, in the version with a block, which may also be omitted;

FIG. 2 shows the coupling device according to the invention in the opening position;

FIG. 3 shows a first construction variation of the coupling device according to the invention, in which the edge of the pan is the horizontal type, and the eccentric coupling system causes vertical sliding with the block;

FIG. 4 shows the coupling system according to the variation in FIG. 3 in the open position;

FIG. 8 is the cross-section view of a version of the coupling system in which the eccentric pin is coupled to a piston which moves towards and away from the edge of the pan;

FIGS. 9 and 10 show versions of the coupling system in which the eccentric pin has a vertical axis;

FIGS. 11 and 12 show a version in which the eccentric pin counters a spring striker element;

FIGS. 13, 13a, 13b and 14, 14a, 14b show versions which use, respectively, spring and eccentric pin safety means that use a protruding tooth or the like.

DESCRIPTION OF SOME FORMS OF EMBODIMENT OF THE INVENTION

Figure 5:
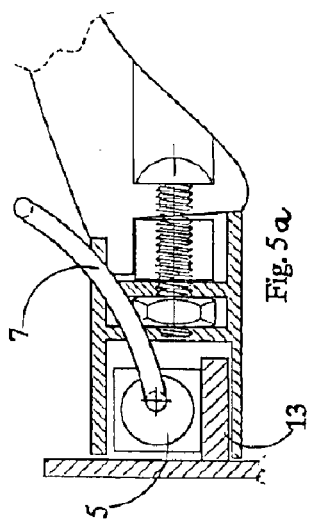
FIG. 5 shows a second construction variation of the coupling device according to the invention with an eccentric pin type coupling which couples a gudgeon type element with recess without a block.

With reference to the attached figures, 1 indicates the complete coupling element according to the invention, which according to a first preferred version comprises the following basic elements:

- a support bracket 2 with a configuration designed to support or receive the handle 3 in various ways which can also be represented by any other gripping element designed for the same purpose;
- a housing 4 cut into said bracket and designed to accommodate a pin 5 whose rotation shaft 6 is decentralised and supports an arm 7 that turns in an angular fashion;
- a fixed striker element 8 integral with said bracket 2 and designed to form a housing in which the edge of the pan is inserted;
- if necessary, a block 9 operated by the eccentric pin 5 and the arm 7, which allows rotation of said pin, said block being designed to allow gripping of the edge of the pan without any friction.

In the example illustrated in the figure, the handle 3 is fixed to the bracket 2 by means of the usual screw type blocking means 10 or by other systems designed for the same purpose.

As can be seen in FIG. 1, blocking of the handle on the vertical edge 11 of the pan is achieved by positioning the support bracket 2 over the edge of the pan while the arm 7 is in the completely raised position in order to obtain maximum opening between the block 9 and the fixed striker plate 8.

It is now sufficient to lower the arm 7 so that the eccentric pin 5 turns and moves the block 9 forward towards the striker 8, so that the edge of the pan is blocked as in a vice.

FIGS. 3 and 4 show a first variation in which the edge of the pan protrudes horizontally, meaning that the coupling system will also be the horizontal type. In this case, in fact, the horizontal edge 12 of the pan is gripped by the block 9, which in this case moves vertically rather than horizontally, while still being operated by the same eccentric pin 5.

Figure 6:
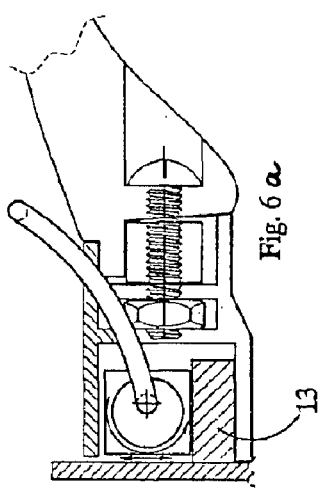
FIG. 6 shows the variation of the preceding figure with a flat gudgeon without recess without a block.
Figure 7:
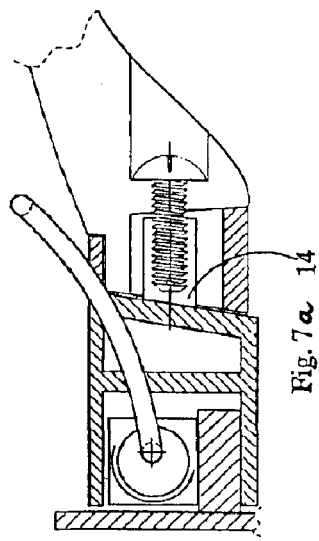
FIG. 7 shows a gripper element according to the invention in a version with a double gudgeon gripper unit without a block.
Figure 5A:
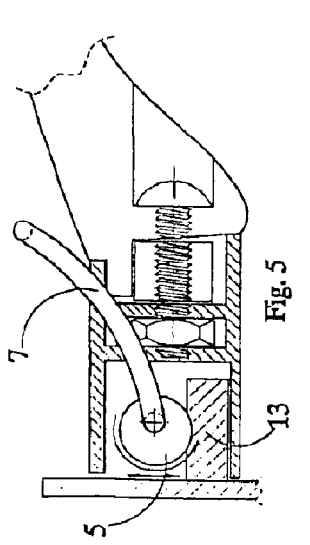
FIGS. 5a, 6a and 7a are views of the three preceding figures, but in this case equipped with a block.
Figure 6A:
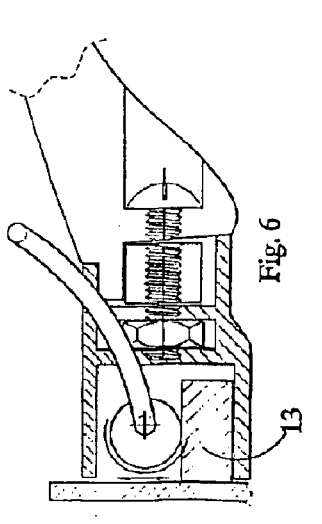
Figure 7A:
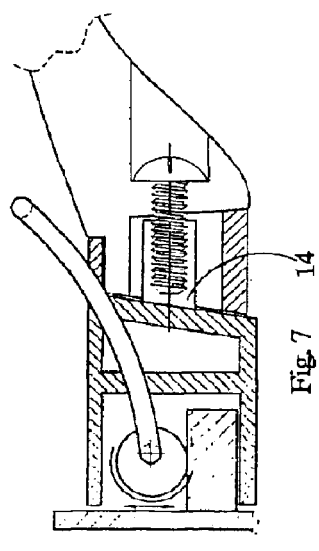

FIGS. 5, 6 and 7 show some possible variations of the coupling system according to this invention, bearing in mind that other coupling solutions are possible, all based on the use of an eccentric pin.

FIG. 5 represents a construction example in which the eccentric pin 5 operates without the use of the block 9, and in this case the blocking of the bracket 2 is achieved by means of a gudgeon 13, normally present on traditional pots and pans, thus offering the possibility of applying this system to existing pots and pans.

While in FIG. 5 the gudgeon is the type with a recess, FIG. 6 shows a flat gudgeon without recess.

FIG. 7 shows a solution in which the handle 3 is fitted to the bracket 2 by means of a "universal" coupling system, to which most handles can be adapted.

In this case, the bracket 2 comprises a coupling equipped with an inner gudgeon 14 which makes it possible to use the majority of handles normally produced and currently on the market, thus offering the possibility of adapting the universal coupling to the various styles and shapes of handles or handgrips, with the lines and designs characteristic to each manufacturer.

The arm 7, which in the example illustrated is the tubular arched type, can also be produced in any other shape appropriate to the same purpose, and positioned in the upper or lower part of the handle, or with a central lever or the like.

FIG. 8 shows a coupling version in which the eccentric pin is coupled to a piston which moves towards and away from the edge of the pan.

FIGS. 9 and 10 show coupling versions in which the eccentric pin has a vertical axis.

FIGS. 11 and 12 show a version in which the eccentric pin operates by countering a spring striker element.

FIGS. 13 and 14 show versions which use, respectively, spring and eccentric pin safety means which have a protruding tooth or the like.

Finally, it should be borne in mind that:

- the fixed striker element can be adjusted to adapt to various thicknesses and shapes of the pan edge or the item to be coupled;
- the use of safety measures is foreseen, to prevent accidental uncoupling;
- the positioning of the eccentric pin axis must be calculated so as to prevent return to the open position.

Sector experts will be able to foresee further construction variations, for example in relation to the shape and size of the pan coupling part or to the shape of the handle coupling part, or also to the shape and size of the arm 7, obtaining solutions which, if based on the use of an eccentric fixing pin, can be considered as part of this invention, defined in the following claims.

What is claimed is:

1. A removable or detachable handle for a utensil, the utensil comprising a coupling element, the handle comprising a blocking system with an eccentric pin, said blocking system operated by means of arms moving in an angular fashion or central levers, wherein said eccentric pin directly operates on the coupling element of the utensil by pushing said coupling element against a fixed striker element, or indirectly operates on the coupling element by operating a blocking element for gripping the edge of the utensil, in opposition to the fixed striker element.

2. A coupling system for a removable handle of a utensil, comprising the following elements:

- a support bracket designed to support or receive the handle in various ways, which can also be a handgrip or any other gripping element designed for the same purpose;
- a housing cut into said bracket designed to accommodate a pin whose rotation shaft is eccentric and supports an arm which turns in an angular fashion, or a central lever or other element designed for the same purpose;

a fixed striker element integral with said bracket and designed to form a coupling housing in which the edge of the utensil or elements protruding from the utensil are inserted.

3. A coupling system according to claim 2, wherein it further comprises a block operated by the eccentric pin and the arm, allowing rotation of the pin, said block being suitable for allowing the edge of the utensil, or the elements protruding from the utensil being gripped without any friction.

4. A coupling system for removable handles according to claim 2, wherein said handle is fixed to the support bracket by the usual screw type blocking means or other systems designed for the same purpose.

5. A coupling system for removable handles according to claim 2, wherein the blocking of the handle on the vertical edge of the utensil is achieved by positioning the support bracket over the edge of the utensil while the arm is in the completely raised position in order to obtain maximum opening between the lock and the fixed striker plate.

6. A coupling system for removable handles according to claim 2, wherein if the edge of the utensil protrudes horizontally then the coupling system is also horizontal, and in this case the horizontal edge of the utensil is gripped by the block, which this time moves vertically rather horizontally, while it is still operated by the same eccentric pin.

7. A coupling system for removable handles according to claim 2, wherein the eccentric pin can also operate without the use of said block.

8. A coupling system for removable handles according to claim 2, wherein the bracket can also be blocked on the elements protruding from the utensil normally present on traditional utensils, thus offering the possibility of using the system on existing utensils.

9. A coupling system for removable handles according to claim 2, wherein the handle can be fitted to the bracket by means of a "universal" coupling, to which a majority of shapes adapt.

10. A coupling system for removable handles according to claim 8, wherein the bracket comprises a coupling equipped with an inner gudgeon allowing a majority of handles normally produced to be used, thus offering the possibility of adapting the coupling to various styles and shapes of handles or handgrips, with lines and designs characteristic to each manufacturer.

11. A coupling system for removable handles according to claim 2, wherein the fixed striker element can be adjusted to adapt to various thicknesses and shapes of the utensil.

12. A coupling system for removable handles according to claim 2 further comprising safety measures to prevent accidental uncoupling.

13. A coupling system for removable handles according to claim 2, wherein positioning of the eccentric pin axis must be calculated in such a way as to prevent a return to the open position.

14. The handle of claim 1, wherein the utensil is chosen from the group consisting of pots, pans, food heating containers, and food cooking containers.

15. The handle of claim 1, wherein the coupling element of the utensil is an edge of the utensil.

16. The coupling system of claim 2 or 3, wherein the elements protruding from the pan comprise a gudgeon.

17. The coupling system of claim 2, wherein the utensil is chosen from the group consisting of pots, pans, food heating containers, and food cooking containers.

* * * * *